July 16, 1963

W. FROEDE ETAL
ROTARY INTERNAL COMBUSTION ENGINE AND
METHOD OF OPERATION THEREOF 3,097,632

Filed April 13, 1960

INVENTORS
WALTER FROEDE
HANNS-DIETER PASCHKE
BY
*Morgan, Finnegan, Durham & Pine*
ATTORNEYS July 16, 1963 W. FROEDE ETAL 3,097,632
ROTARY INTERNAL COMBUSTION ENGINE AND
METHOD OF OPERATION THEREOF
Filed April 13, 1960 7 Sheets-Sheet 3

INVENTORS
WALTER FROEDE
HANNS-DIETER PASCHKE
BY
*Morgan, Finnegan, Durham & Pine*
ATTORNEYS

INVENTORS
WALTER FROEDE
HANNS-DIETER PASCHKE
BY
ATTORNEYS

FIG. 9.

INVENTORS
WALTER FROEDE
HANNS-DIETER PASCHKE
BY
ATTORNEYS

FIG. 10.

INVENTORS
WALTER FROEDE
HANNS-DIETER PASCHKE

July 16, 1963

W. FROEDE ETAL

3,097,632

ROTARY INTERNAL COMBUSTION ENGINE AND
METHOD OF OPERATION THEREOF

Filed April 13, 1960

INVENTORS
WALTER FROEDE
HANNS-DIETER PASCHKE
BY

ATTORNEYS

United States Patent Office 3,097,632
Patented July 16, 1963

3,097,632
ROTARY INTERNAL COMBUSTION ENGINE AND METHOD OF OPERATION THEREOF
Walter Froede and Hanns-Dieter Paschke, Neckarsulm, Germany, assignors to NSU Motorenwerke Aktiengesellschaft, Neckarsulm, Germany, and Wankel G.m.b.H., Lindau (Bodensee), Germany
Filed Apr. 13, 1960, Ser. No. 21,939
Claims priority, application Germany Apr. 17, 1959
19 Claims. (Cl. 123—8)

This invention relates to internal combustion engines and to methods of operating the same in a working cycle which includes the four phases of intake, compression, expansion and exhaust. More particularly, this invention relates to rotary internal combustion engines having at least a pair of bodies or members mounted, one within the other, for relative rotation to provide variable volume working chambers, and to methods of operating such engines in a working cycle which includes the four phases above-mentioned.

In engines of the type aforesaid, the outer member may be the stationary or rotary member and the inner member the rotary or stationary member, so long as the configuration of each and the relative angular displacement of one member with respect to the other is such as to produce the desired variable volume chambers. To satisfy one particular mode of operation, the outer member may be made the stationary member and the inner member may be made the rotary member; to satisfy another particular mode of operation, the outer member may be made the rotary member and the inner member may be made the stationary member; and, to satisfy still another particular mode of operation, both the outer and inner members may be made rotary members with one of the members rotating at a greater angular velocity than the other.

Internal combustion engines provided with reciprocating pistons and having a six stroke cycle of operation are well known. The aforesaid six stroke cycle of operation usually includes the ordinary four-stroke operation plus two additional strokes providing for the intake and exhaust of cooling air. Other known engines operating on a six-stroke cycle may include the following six strokes: a pre-intake, an intake, a pre-compression, a compression, an expansion, and an exhaust of the burnt gases.

The present invention is directed especially to a novel rotary internal combustion engine having relatively rotatable bodies providing a number of variable volume working chambers and to a novel method of working such engines in a six phase cycle which includes the four phases of intake, compression, expansion and exhaust. The novel engine, therefore, enables a two-stage compression of the combustion medium, without the provision of additional moving parts and results in improved efficiency of operation. An important advantage of the engine of the present invention is that gasoline, and fuels less volatile than gasoline, may be employed in its operation, and an engine operated in accordance with the novel method to be further described subsequently can be assumed to be an "all-fuel" engine.

An object of this invention is to provide a new and improved rotary internal combustion engine of the nature aforesaid, and method of operation thereof, in and by which each of the variable volume working chambers operates on a six-phase operational cycle which includes the four stages of intake, compression, expansion and exhaust.

Another object of this invention is to provide a new and improved rotary internal combustion engine of the nature aforesaid, and method of operation thereof, in and by which each of the variable volume working chambers, operates on a six-phase operational cycle which includes a two-stage compression of combustion medium.

A further object of this invention is to provide a new and improved rotary internal combustion engine of the nature aforesaid, and method of operation thereof, in and by which each of the variable volume working chambers operates on a six-phase operational cycle which includes, in addition to the four phases of intake, compression, expansion and exhaust, an additional intake phase and an additional compression phase.

Another object of this invention is to provide a new and improved rotary internal combustion engine of the nature aforesaid, and method of operation thereof, in and by which each of the variable volume working chambers operates on a six-phase operational cycle which includes the two intake phases and two compression phases.

Yet another object of this invention is to provide an internal combustion power plant in which rotary internal combustion engine units of the nature aforesaid, are paired into a unitary structure for operation of the group of variable volume chambers of one in suitably phased relation to the group of chambers of the other, and in which separate charges of like or different combustion medium, are supplied to each variable volume working chamber during its operational cycle, one charge being supplied during one of two alternate phases of a six-phase operational cycle for the chamber, and another of the charges during the other of the two alternate phases.

Still another object of this invention is to provide a rotary internal combustion engine of the nature aforesaid, having four variable volume working chambers and having two intake ports for supplying separate charges of combustion medium to each of said chambers at separate phases in the operational cycle of each chamber, and to provide a method of operating such engine by which each of the four chambers operates on a six-phase cycle which includes, in addition to four phases of intake, compression, expansion and exhaust, an additional intake phase and an additional compression phase.

A further object of this invention is to provide a new and improved rotary internal combustion engine of the nature aforesaid, and method of operation thereof, which will enable the use, as fuels in the engine, both of gasoline and fuels less volatile than gasoline.

Still another object of this invention is to provide an internal combustion power plant in which rotary internal combustion engine units of the nature aforesaid are combined into a unitary operating structure of which the outer bodies of the respective units provide a common intake system serving separate intake ports in each of the units.

Another object of this invention is to provide a new and improved rotary internal combustion engine of the nature aforesaid, having an internal transfer passage effective to place each two adjacent working chambers of the engine into fluid communication with each other once during each operational cycle of each chamber.

Yet another object of the present invention is the provision of an improved rotary internal combustion engine of the above character which is of simple design and construction, economical to manufacture and highly efficient in the accomplishment of its intended purpose.

The six-phases of operation of the cycle, as carried out in sequence in any given one of the variable volume working chambers in accordance with the method of the present invention, are as follows.

First phase: An intake phase in which a charge of a first combustion medium is sucked or drawn into a given chamber.
Second phase: A compression-transfer phase in which the charge of first combustion medium in the chamber is compressed in the chamber and the compressed charge transferred to the preceding chamber by being discharged under its own pressure from the given chamber into the preceding chamber.

Third phase: A further intake phase in which a charge of a second combustion medium is sucked or drawn into the given chamber and in which a charge of the first combustion medium is thereafter transferred to this chamber from the following chamber; this latter charge being one which has been compressed in the following chamber and is discharged therefrom under its own pressure into the given chamber.

Fourth phase: A compression-ignition phase in which the mixture of the charge of the second combustion medium and the charge of the first combustion medium in the given chamber, is compressed and then ignited.

Fifth phase: An expansion phase in which work is done by expansion of the ignited mixture in the given chamber.

Sixth phase: An exhaust phase in which exhaust or removal of the burnt gases from the given chamber takes place.

It will be understood that the same six-phase cycle is carried out in each of the variable volume working chambers, in turn.

The foregoing method may be carried out in different manners or ways. It is possible to draw pure air into the chamber during the first and third phases, respectively, and to add fuel to the charge of the second combustion medium during the transfer operation which occurs toward the end of the third phase, or to add fuel during the third phase, by means of a fuel injection nozzle or carburetor. As an alternative within the scope of the present invention, it is possible to draw an overrich fuel-air mixture as the combustion medium into the given chamber during the first phase, and to draw pure air into the same chamber during the third phase. Yet another alternative within the scope of the present invention is to draw a stoichiometric fuel-air mixture as the combustion medium into the chamber during the first and third phases, respectively.

One type of novel rotary engine which may be used for carrying out a working cycle composed of the aforementioned six phases generally comprises an outer body or member having axially spaced end walls and a peripheral wall interconnecting the end walls and including three symmetrically arranged, circumferentially spaced lobe-defining portions on its inner surface, and an inner member. The outer member has its inner peripheral surface provided with arched lobe-defining portions, the surface being shaped as, preferably, a three-lobed epitrochoid. The inner member is generally a four sided figure which has, generally, the form of a square. Either the outer member or the inner member may be made the stationary member with the other member made the rotary member, or both members may be rotary members so long as there is relative rotation of one member with respect to the other.

The outer surface of the inner member and the inner surface of the outer member are related to each other to define four variable volume working chambers with the inner member having its geometrical center displaced from the geometrical center of the outer member and rotatable thereabout thereby varying the volume of the four working chambers. A first intake port is provided in the outer member shortly after or beyond a point at a minimum distance from the geometrical center thereof with respect to the direction of rotation of the inner member relative to the outer member, and a second intake port is provided shortly after the next point at a minimum distance from the center of the outer member in the aforesaid direction of rotation, both of the intake ports being provided for the insertion of the first and second combustion mediums, respectively. A transfer passage is provided in the outer member to provide for the transfer of a charge of the first combustion medium from a given working chamber to the next preceding working chamber in the direction of rotation of the inner member; the transfer passage being positioned effectively subsequent to both of the inlet ports and for certain purposes may be provided with means for the insertion of fuel when both combustion mediums are pure air. The fuel, when both combustion mediums are air, is carried over by the passing air and is thoroughly distributed in the air.

The transfer passage is suitably arranged in the peripheral wall or mantle of the outer member at that portion of the outer member at which, preferably, an over-critical pressure gradient exists between the adjacent working chambers, that is, at which the pressure ratio is at least equal to the critical pressure ratio. As a result of the over-critical pressure gradient, the transfer velocity becomes as high as possible thereby resulting in a good mixture of fuel and air.

It is known that in the flow of all combustible fluids through a passage converging to a throat, that is, flow through a nozzle, the pressure at the throat of the nozzle, where the cross section of the nozzle is smallest, is the so-called critical flow pressure. It is also known that for a given nozzle inlet pressure, a progressive decrease in the pressure at the discharge end of the nozzle will result in an increase in the amount of fluid passing the throat, and hence the transfer velocity, until the discharge pressure equals the critical flow pressure, but further decrease in the discharge pressure does not result in increased flow. It is also known that the radio of critical flow pressure to inlet pressure is practically constant for any particular gas. Thus, in transferring a gas through a nozzle from a high pressure chamber to another chamber at a lower pressure, maximum transfer velocity will occur when the pressure gradient from the high pressure chamber to the low pressure chamber is such that the pressure ratio between the chambers is at least equal to the critical pressure ratio. Such a pressure gradient may be conveniently referred to as an over-critical pressure gradient.

The objects, advantages and nature of the invention will be more fully understood from the following decription of the preferred embodiment of the invention, shown, by way of example, in the accompanying drawings, in which.

Referring now more particularly to the drawings, FIGURES 1–8 illustrate the phase relationships or operation steps of an outer member or body 12 and an inner member or rotor 14 with respect thereto in an engine according to the invention and demonstrating the presently preferred mode of practicing the method of the invention. In the following description, outer member 12 is indicated as the stationary member and may be referred to as such and the inner member or body 14 is indicated as the rotary member and may be referred to as such to simplify the explanation of the method of operation. However, it is to be understood that it is within the scope of the present invention to make member 12 the rotary member and member 14 the stationary member, or merely to provide a relative angular velocity between members 12 and 14.

Outer member 12 has its inner peripheral surface 16 shaped as a three-lobed epitrochoid and hence having arched lobe-defining portions. Member 12 has a geometrical center generally designated A, which can be considered the axis of the outer member, and encloses inner member 14 which is journaled on an eccentric 20 of a shaft 18. The geometric center or rotational axis of shaft 18 coincides with the geometric center A of outer member 12. The inner member 14 and eccentric 20 have the same geometrical center, generally designated B. Geometrical center B of inner member 14 and eccentric 20 is displaced from geometrical center A and describes a circular path thereabout upon rotation of the inner member 14 on the eccentric 20. An externally-toothed sun gear 12′ concentric with the shaft 18 is fixed to the outer member 12 and is in toothed engagement with an internally-toothed ring-gear or planet gear 14′ concentric with and fixed to the inner member 14, for maintaining the inner member 14 in an initially properly indexed relation to the outer member 12 and to the shaft eccentric 20, at all times, the speed ratio between the inner member 14 and the shaft 18 being 1:4, The outer contour of inner member 14 has four arched or curved sides and, as shown, has the form of a square. Inner member 14 is provided with four apices which are in continuous sliding contact with the inner peripheral surface 16 of outer member 12 and are provided with axis-parallel, radially movable sealing strips 22, one at each of the apices, for providing fluid-tight contact between the apices and the inner peripheral surface 16, thereby dividing the space between the inner member and the inner portion of the outer member into four variable volume working chambers $V_1$, $V_2$, $V_3$ and $V_4$.

The inner peripheral surface 16 includes three portions 24, 24a and 24b which are the closest points thereon to the geometrical center A of the outer member 12, and indicate minimum distances from the center A. Beyond the portion 24, in the direction of rotation of inner member 14, that is, counter-clockwise as viewed in FIGS. 1–8, there is provided through one end wall of the outer member 12, an inlet port 26, and before the portion 24 there is provided through the peripheral wall of the outer member, an outlet port 28. Subsequent to portion 24a, in the direction of rotation of inner member 14, there is provided through the same end wall of the outer member 12, a second inlet port 44, and a recess or cut-out portion 32 of suitable shape, is provided in outer member or mantle 12 inwardly of the inner peripheral surface 16 thereof. Cut-out portion 32 defines a transfer passage for a purpose to be hereinafter further explained. It is to be further noted that the cut-out portion is effectively beyond both inlet ports 26 and 44 in the direction of rotation of inner member 14. Transfer passage 32 is arranged at that spot at which an over-critical pressure exists between adjacent working chambers.

A complete operation or working cycle of one chamber $V_1$, will now be described, and it is to be understood that each chamber $V_1$, $V_2$, $V_3$ and $V_4$ follows the exact same working cycle in the cyclic sequential order $V_1$, $V_4$, $V_3$ and $V_2$. It will also be understood that in the following description of the working cycle in connection with FIGURES 1–8 of the drawings which illustrate eight individual operational positions, $V_1$ appears in the first eight operational positions as chamber $V_1$, in the second eight operational positions as chamber $V_2$, in the third eight operational positions as chamber $V_3$ and in the fourth eight operational positions as chamber $V_4$. The eight operational positions for each chamber $V_1$, $V_2$, $V_3$ and $V_4$, when completed, complete the six phases of operation of the cycle for one chamber, requiring one complete rotation of the inner member 14.

Figure 1:
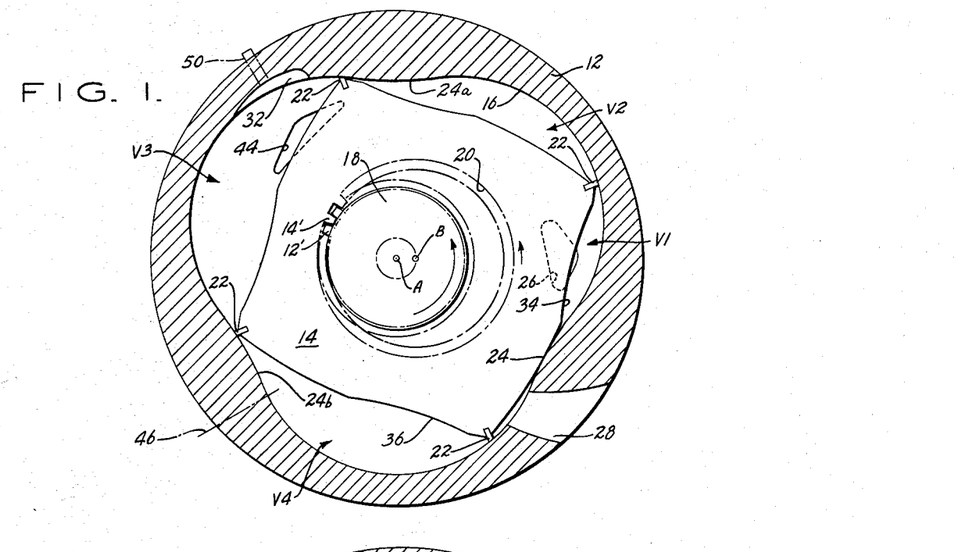
FIGURES 1–8 are a series of diagrammatic views illustrating, successively, the angular relationship of two relatively rotatable members of a rotary internal combustion engine, for one-quarter of the cycle of operation thereof.
Figure 2:
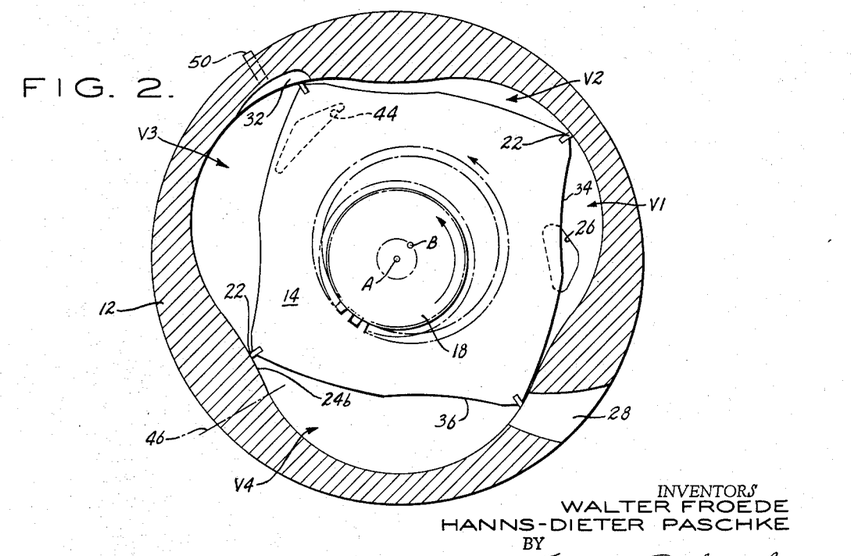
Figure 3:
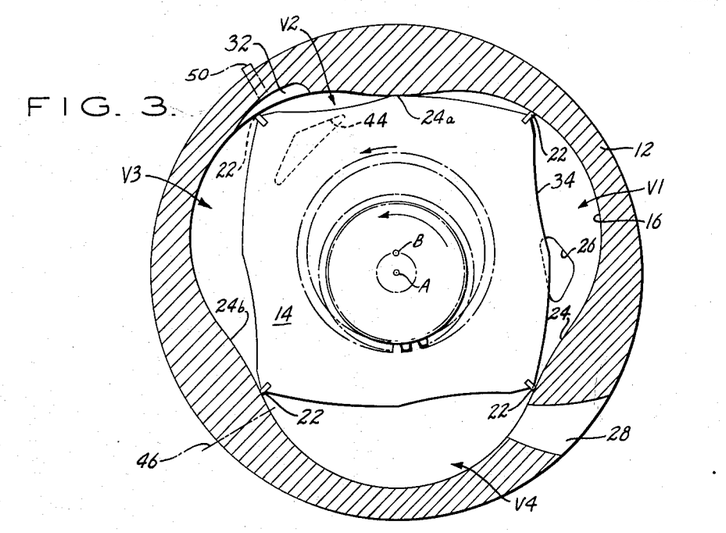

In FIGURE 1, the first or intake phase is commencing for chamber $V_1$ and the inner member is shown as being positioned shortly beyond or ahead of a top dead-center position for chamber $V_1$, in the direction of rotation of the inner member 14 as designated by the curved arrows, in which position, and with reference to chamber $V_1$, the first intake port is just opening. The volume of chamber $V_1$ increases in the successive operational positions as shown in FIGURES 1–5 and can be considered to perform the first phase of the six phase operation of the engine. It will be assumed for the purposes of the present discussion that a charge of an over-rich mixture as a first combustion medium, is drawn into chamber $V_1$ through intake 26. In FIGURE 1, it will be noted that as inner member 14 moves in the direction shown by the arrows, the leading portion of the side 34 of the inner member 14 commences to uncover inlet port 26 to permit entry of the combustion medium into chamber $V_1$ whose volume is increasing. In FIGURES 2 and 3, port 26 is still partially covered by side 34, and in FIGURES 4 and 5, port 26 is completely uncovered by side 34 thereby permitting the full use of the orifice area of the port for the intake of the combustion medium. Chamber $V_1$ attains its maximum volume at substantially the position shown in FIG. 5, thus completing the first phase of the cycle.

Figure 6:
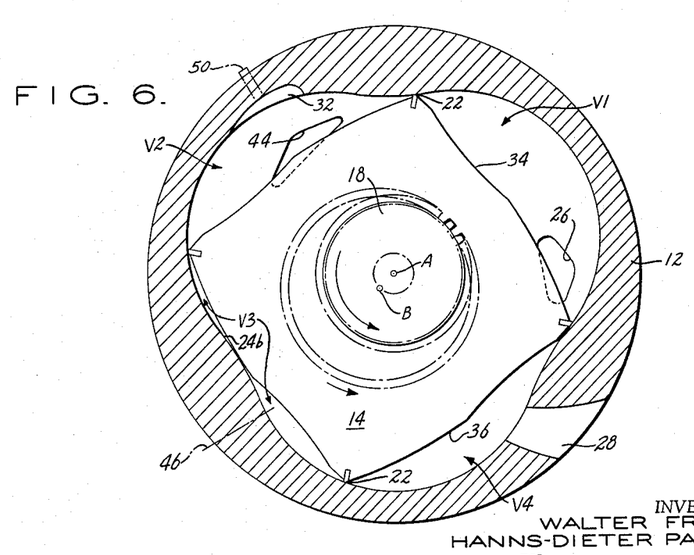
Figure 7:
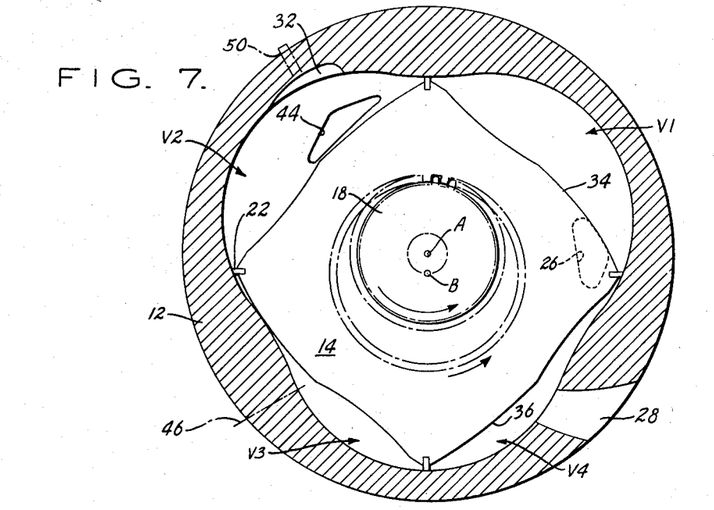
Figure 8:
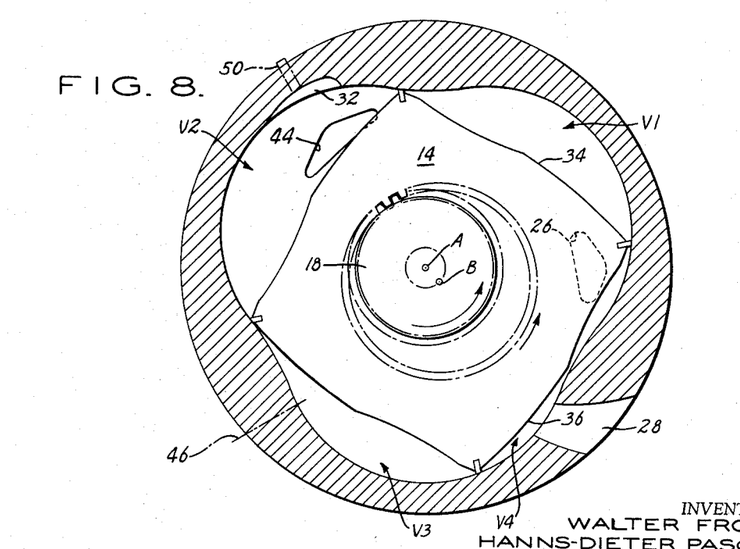

In FIGURES 6 to 8, the orifice area of port 26 decreases as it is gradually covered by the trailing portion of side 34, until the port is completely covered, as in FIGURE 7, and remains covered as in FIGURES 7 and 8, while under the apex portion between side 34 and the next trailing side 36 which is associated with chamber $V_4$. In FIGURE 6, the trailing portion of side 34 commences to cover the inlet port 26, and in FIGURES 7 and 8, the inlet port 26 is shown as completely covered, for two operative positions of inner member 14.

As soon as inner member 14 starts to cover inlet port 26, the second or compression phase commences, the FIGURE 6 relationship illustrating a position shortly after the commencement of the compression. When the position of inner member 14 shown in FIGURE 8 is reached, chamber $V_1$ has moved into substantially the position formerly occupied by chamber $V_2$ as the latter appears in FIGURE 1. When chamber $V_1$ moves into the position of chamber $V_2$ as shown in FIGURE 3, the end of the second phase is reached.

However, prior to and toward the end of this second phase, another event takes place, and for this purpose outer member 12 is provided with the cut-out or recessed portion 32 which acts as a transfer passage permitting substantially all of the compressed mixture in chamber $V_1$ (in the $V_2$ position of FIGS. 2 and 3) to be blown into the next preceding chamber $V_2$ (in the $V_3$ position of FIGS. 2 and 3). The end of the second phase is completed for chamber $V_1$ (in the $V_2$ position) when the rotor takes a position approximately as shown in FIGURE 3. It will be evident that when chamber $V_1$ has taken the position of chamber $V_2$ in FIGURES 1–8, then chamber $V_2$ takes the position of chamber $V_3$, etc. It will be apparent that with chamber $V_1$ in the $V_2$ position, FIG. 2, the pressure in chamber $V_1$ in this position is high relative to the pressure in the chamber $V_2$ (in the $V_3$ position, FIG. 2). Hence, the charge in $V_1$ (in the $V_2$ position, FIG. 2) will be discharged under its own pressure from $V_1$ into chamber $V_2$ (in the $V_3$ position, FIG. 2) when the transfer passage 32 is uncovered by the rotor apex between chamber $V_1$ (in the $V_2$ position, FIG. 2) and chamber $V_2$ (in the $V_3$ position, FIG. 3). The transfer passage 32 is located in the inner peripheral wall 16 at a point between the minimum distance points 24a and 24b, of, preferably, over-critical pressure, that is, a point where the pressure ratio between the chamber $V_1$ (in the $V_2$ position, FIG. 2) and the chamber $V_2$ (in the $V_3$ position, FIG. 2) is equal to or preferably above the critical pressure ratio between these chambers.

Figure 4:
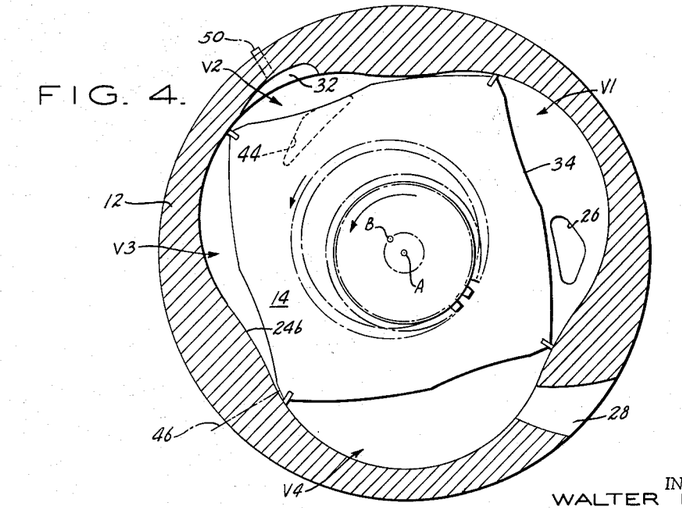
Figure 5:
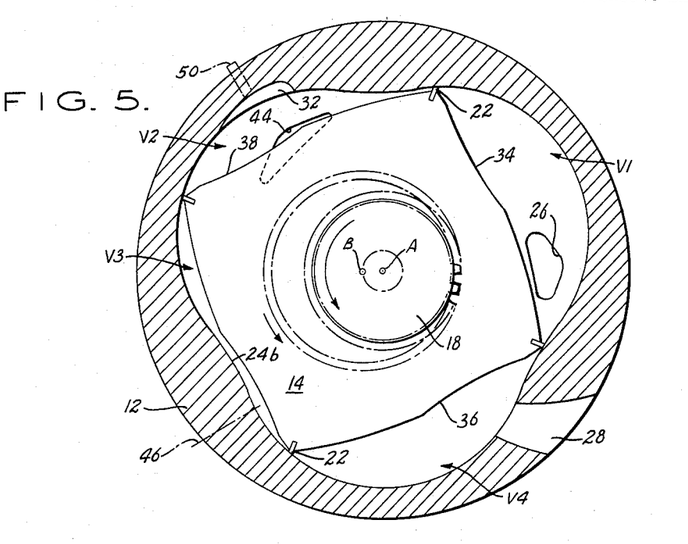

The third phase now commences, and referring now more particularly to FIGURE 5 of the drawings, chamber $V_1$ (in the $V_2$ position, FIG. 5) has been placed in communication with the second inlet port 44 provided in outer member 12. As inner member 14 continues to rotate in the direction of the arrows, the leading portion of the side of the inner member 14 for chamber $V_1$ (in the $V_2$ position shown in FIGURE 5) uncovers the second inlet port 44 enabling it (chamber $V_1$) to suck a second combustion medium thereinto through the second inlet port 44 as a result of the increasing volume of chamber $V_1$. The second inlet port 44 is not opened to permit this intake until chamber $V_1$ (in the $V_2$ position) is reexpanded to atmospheric pressure, in order to avoid losses in efficiency and charge. This condition is obtained substantially as indicated in FIGURE 4. While the second inlet port is open to chamber $V_1$ (in the $V_2$ position, FIG. 5) there is no communication between adjacent chambers for the combustion medium therein through transfer passage 32 so that transfer passage is effectively beyond the second inlet port in the direction of rotation of inner member 14; transfer passage 32 may be considered to be rendered open upon closing of the second inlet port 44 which condition is approaching in FIG. 1 and has been completed in FIG. 2.

Chamber $V_1$ may now be considered as being in the $V_3$ position as shown in FIGURE 1, and between the FIGURE 1 and FIGURE 2 positions of chamber $V_1$ after it has taken the $V_3$ position, an overrich mixture is discharged or blown through transfer passage 32 into chamber $V_1$ from the next following chamber, namely chamber $V_4$, which is now in the $V_2$ position, beginning with FIGURE 2 and continuing on into FIGURE 3. This now completes the third phase and chamber $V_1$ (in the $V_3$ position approximately as shown in FIG. 3) now contains a mixture of the first and second combustion medium to be compressed and ignited in the fourth or compression-ignition phase.

The fourth phase for chamber $V_1$ now commences and the chamber $V_1$ (in the $V_3$ position, FIGS. 3, 4 and 5) decreases in volume as the rotor advances, and the contents thereof are compressed and ignited. To provide for spark-fired ignition of the mixture, a spark plug, diagrammatically indicated by the dash-dot line 46, may be provided. The spark plug is located to pass through the wall of outer member 12 into communication with chamber $V_1$ (in the $V_3$ position) as shown in FIGS. 4–8, preferably at said minimum distance point 24b or in close proximity thereto. Spark-fired ignition in the cycle being described, takes place in this fourth phase of chamber $V_1$, but it will be understood that ignition may be caused to take place without use of a spark plug under certain operating conditions such as in a Diesel engine. Upon ignition chamber $V_1$ (in the $V_3$ position) moves into the position shown in FIGURE 6 and the fourth phase is completed.

The fifth or expansion phase for chamber $V_1$ now commences. This expansion of chamber $V_1$ (in the $V_3$ position) continues as indicated in FIGS. 7 and 8, until chamber $V_1$ occupies substantially the position of chamber $V_4$, as shown in FIG. 1. This marks the completion of the power, work or expansion phase.

Shortly after chamber $V_1$ reaches the position of chamber $V_4$ in FIGURE 1, the sixth or exhaust phase commences, this phase for chamber $V_1$ (in the $V_4$ position) being underway as in FIGURE 2 so that exhausting of chamber $V_1$ (in the $V_4$ position) takes place through outlet port 28 which is provided in the wall of outer member 12. The burnt gases in chamber $V_1$ (in the $V_4$ position) continue to be exhausted or removed as the inner member 14 moves from the position shown in FIGURE 2 to the FIGURE 8 position. In this latter position, substantially the entire content of combustion products of the chamber $V_1$ (in the $V_4$ position) will have been exhausted, to complete the sixth phase and thereby completing the cycle.

This same working cycle is performed individually by each of the chambers $V_1$, $V_4$, $V_3$ and $V_2$ in that order. It is understood that the first phase of the working cycle for the following chamber $V_4$ commences when $V_1$ is in the second phase and, more specifically, when $V_1$ is in the $V_2$ position of FIG. 1. The working cycle for $V_3$ follows in a similar manner and that for $V_2$ follows that of $V_3$.

In the above explanation of the six phase cycle, it was assumed that a charge of overrich fuel-air mixture was drawn in through the inlet port 26 and that a charge of pure air was drawn in through inlet port 44. It is to be understood as being within the scope of the present invention to draw or suck in a stoichiometric fuel-air mixture of pure air through both ports 26 and 44.

In the case in which pure air as a combustion medium is drawn in through both ports 26 and 44, it is necessary to provide for a separate fuel intake. To meet this requirement, fuel addition means, diagrammatically indicated at 50, are provided in communication with chamber $V_1$ (in the $V_3$ position of FIGURE 2) to insert fuel into the chamber $V_1$ (in the chamber $V_3$ position). Fuel addition means 50 may be a pressure-carburetor or a fuel injection nozzle, located, preferably, so as to deliver the fuel directly into the transfer passage 32. By such arrangement, a fuel-air mixture, or fuel as such, may be added directly to the stream of combustion medium moving at high velocity and in a highly turbulent state from the chamber $V_1$ (in the $V_2$ position of FIGURE 2) into the preceding chamber $V_2$ (in the $V_3$ position of FIGURE 2). Thus, highly efficient mixing of the fuel and air of the combustible mixture, is effected, and stratification is minimized or substantially or completely eliminated.

Figure 9:
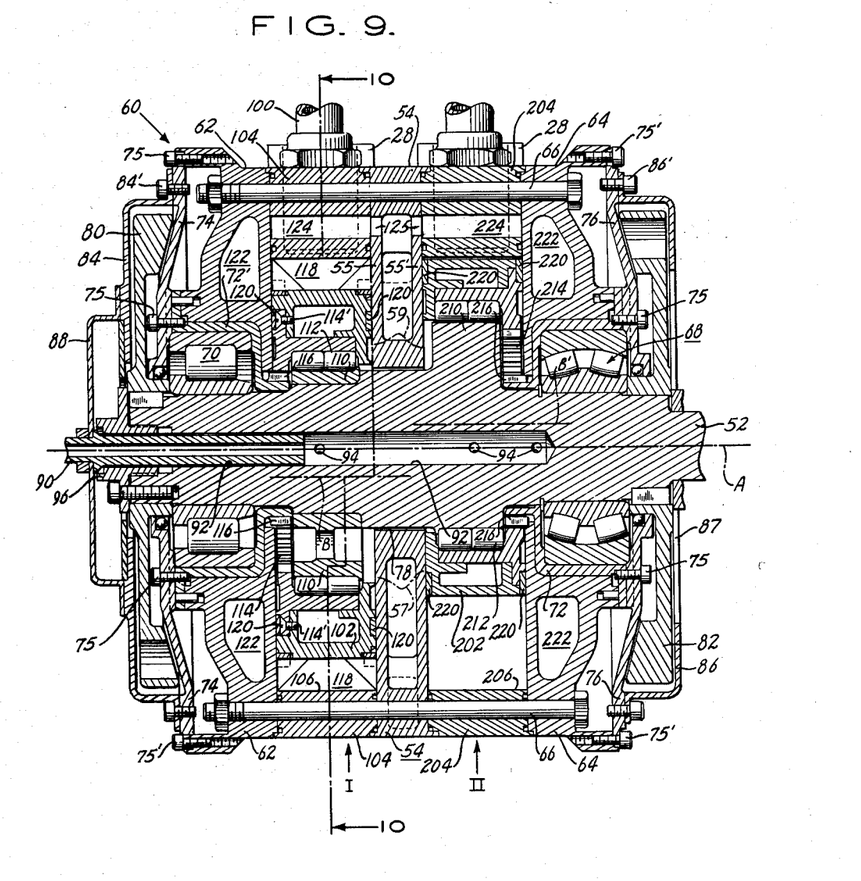
FIGURE 9 is a longitudinal sectional view taken on line 9—9 of FIGURE 10, illustrating a rotary engine operating in accordance with the angular relationship shown in FIGURES 1–8 and comprising, in tandem, two substantially identical engine units.
Figure 10:
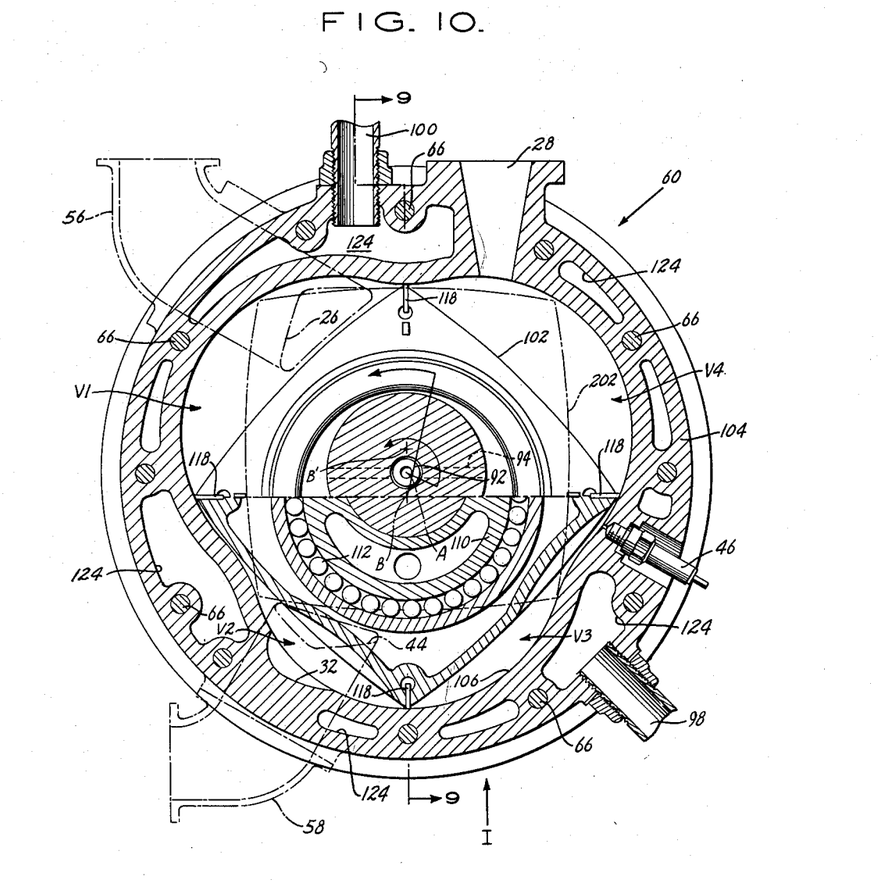
FIGURE 10 is a sectional view taken on line 10—10 of FIGURE 9.
Figure 11:
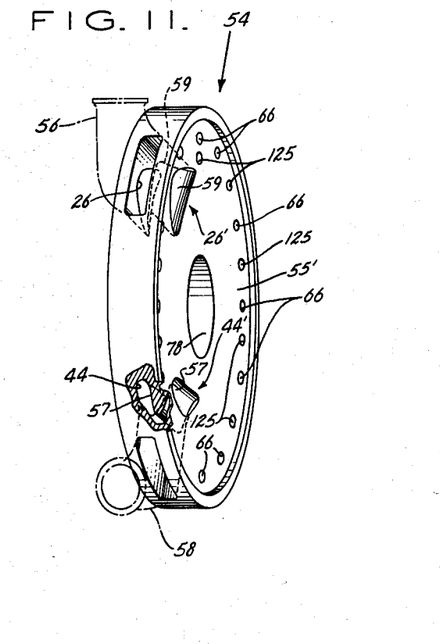
FIG. 11 is a perspective view of the ported wall structure of the embodiment of FIGS. 9 and 10.

Referring now to FIGURES 9 and 10 of the drawings, these illustrate two sectional views of an internal combustion power plant operable in accordance with a working cycle having the six phases described hereinbefore. The power plant generally includes two substantially similar rotary internal combustion engine units I and II having a common power output shaft 52 upon which, in turn, are journalled a pair of axially-spaced inner rotary members 102 and 202. Positioned between these rotary members is a common hollow intermediate wall 54 having axially-spaced walls 55 and 55' serving as end walls for the engine units I and II, respectively, and having in its hollow interior a common first intake canal 56 and, independent thereof, a common second intake canal 58. Both canals are shown in projection on FIGURE 10 with chain-dashed lines 57 and 59, and are more particularly shown in FIGURE 11. These canals are bifurcated interiorly of wall 54, as indicated in FIGURE 9 with chain dashed and dotted lines 57, 59 so that canal 56 feeds one pair of intake ports 26, 26' in end walls 55 and 55', respectively, and canal 58 feeds another pair of intake ports 44, 44' in end walls 54 and 55, respectively. Canals 56 and 58 extend from their intake ports 26 and 44 at a right angle to the largest extension of the ports, in order to obtain a large cross-sectional area of the canal and yet keep the thickness of the common or intermediate wall 54 as small or as thin as possible, for a purpose to be explained hereinafter.

The outer member includes a housing generally designated 60 and comprises a pair of hollow end walls 62, 64, hollow shells 104, 204 of engines I and II and the common or intermediate hollow wall 54. The inner peripheral surfaces 106 and 206 of shells 104 and 204, respectively, are each in the form of a three-lobed epitrochoid, and the inner surfaces 106, 206 are in phase relationship to each other and form the same projection when a section is taken in a plane normal to shaft 52. The end walls, shells and common wall are bolted together in a fixed relationship by means of coupling devices such as nuts and bolts 66, the hollow interiors being in communication with each other for circulation of cooling liquid supplied via supply pipe 98 and discharged via discharge pipe 100.

Shaft 52 having the rotational axis A, is provided with two eccentric portions 110 and 210 and is rotatably coupled to housing 60 by means of roller or other suitable bearing devices 68 and 70 which are positioned in bearing retainers 72, 72' and fixedly retained therein by means of end bearing plates 76 and 74, respectively, removably fastened thereto as by bolts 75. The bearing plates 74 and 76 are removably fastened to the end walls 62 and 64, respectively, as by bolts 75'. Intermediate wall 54 is provided with a central aperture 78 of a diameter which is slightly larger than the diameter of the portion of shaft 54 which passes therethrough to provide a suitable lubricating clearance therebetween. As mentioned heretofore, common wall 54 is made as thin as possible to provide for the desirable feature of placing bearings 68 and 70 as close to each other as possible.

Eccentric portion 110 is shown as a separate part removably keyed to drive shaft 52 so as to enable intermediate wall 54 to be a one-piece unit. This eccentric carries inner rotary member 102 which is journalled thereon through the provision of suitable roller bearings 112. A gearing system comprising an outer ring or planet gear 114 having teeth on the inner periphery thereof has the geometrical axis B in suitably parallelly spaced relation to rotational axis A, and, as shown, is coupled fixedly and removably to the rotary member 102 by bolts 114'. The ring gear 114 cooperates with a stationary sun gear 116 having the same geometric axis A as shaft 52 and preferably formed integrally with bearing housing 72' for the purpose of maintaining constant the desired indexed and speed ratio relation between rotary member 102 and the shaft 52.

In a similar manner, rotary member 202 is journalled by means of suitable roller bearing means 212, to eccentric portion 210 which in this case has an equivalent axis-parallel, spaced geometric axis B' and is integral with shaft 52, although this eccentric may be a separate part, like eccentric 110, if desired. The gearing system for rotary member 202 comprises an internally-toothed ring gear 214 preferably removably coupled thereto, which gear has the same geometric axis B' as the rotor 202 and cooperates with a sun gear 216 preferably formed integrally with bearing housing 72, for maintaining constant the desired indexed and speed ratio relation between rotary member 202 and the shaft 52. Eccentric portions 110 and 210 are arranged in diametrically opposite directions to each other, to displace the working chambers of engine unit I by 45° from engine unit II, as appears from FIGURE 10.

Keyed onto shaft 52 at opposite ends thereof are balancing counter-weights 80, 82. The outer end enclosures 84 and 86 are fixedly removably coupled to end enclosures 74 and 76, respectively, as by bolts 84' and 86', respectively, so as to be stationary with end walls 62 and 64, respectively. Outer end closure 86 is provided with a central opening 87 to permit shaft 52 to pass therethrough and to be rotatably free thereof.

At the left end of FIGURE 9, there is shown an oil-supply-tube mounting plate 88 affixed to end enclosure 84 and having an oil-supply tube 90 fixed thereto and provided with a central bore to permit the supply of lubricating oil to the power plant. Shaft 52 is provided with a central bore 92 of larger diameter than the tube 90 for the reception of tube 90. The shaft 52 is provided with a suitable number of radial passages 94 through which lubricating oil introduced under pressure through the tube 90 into the bore 92, may flow through the passages 94, to various bearings of the power plant. Shaft 52 carries oil seal gland member 96 for sealing the shaft 52 against oil loss at the oil-input end.

Rotary members 102, 202 are also provided with peripheral apex seals 118, (the section line on FIGURE 10 being taken in the surface plane of the peripheral seals of rotary member 102) to ensure fluid-tight contact between the apex portions of the rotary members with the inner peripheral surfaces 106, 206 of the outer bodies 104 and 204, respectively, thereby providing the four chambers $V_1$, $V_2$, $V_3$ and $V_4$.

End seals 120 and 220 are provided on opposite sides of rotary members 102, 202 respectively in face-to-face contact with end walls 62, 64 and both sides of common wall 54.

Referring now more particularly to FIGURE 10 which illustrates a section through engine unit I of FIGURE 9, outlet port 28 in shell 104 is provided for exhausting or discharging the burnt gases. Shell 104 is also provided with a spark plug 46 or other ignition device, and transfer passage 32. Although not shown in FIGURE 9, it is understood that shell 204 is also provided with an outlet port 28 for the burnt gases, a spark plug or other ignition device 46 and transfer passage 32. The first inlet port 26 and the second inlet port 44 together with their respective canals 56 and 58 are arranged within the common wall 54 of the housing. The circulation of cooling fluid may be provided for, and for this purpose, intake 98 and outlet 100 for cooling fluid are provided. The cooling fluid which enters through inlet port 98 circulates through openings 122, 222 in the end walls 62, 64 respectively, through openings 124 and 224 in the shells 104 and 204, respectively, and through openings 125 in the common wall 54.

In order to show the respective phase positions of rotary members 102 and 202, rotary member 202 is shown in phantom outline only by means of chain dot-dash lines with the working chambers of engine unit II displaced 45° from those of engine unit I. The construction of engine unit II is in all other respects the equivalent of the construction of engine I.

While the inlet ports 26, 26' and 44, 44' are shown in the drawing as being arranged in the end walls 55, 55', respectively, of the common wall 54, it is also possible to arrange them in the peripheral surfaces of the shells 104, 204 in a manner similar to that for the outlet ports 28 for the exhaust canals, or they may be suitably arranged in the end walls 62, 66.

Both engine units I and II were discussed as comprising a stationary housing 60 and two inner rotary members 102 and 202. The housing 60 may be made the rotary portion and rotary members 102 and 202 may be made the stationary members; and further, both housing 60 and rotary members 102 and 202 may have rotary movement imparted thereto, and in this case the housing 60 in FIGURES 9 and 10 or outer member 12 in FIGURES 1–8 can also rotate about its center A with a speed ratio of 4:3 with respect to rotary members 102, 202 or inner member 14, respectively. Consequently, the relative rotation of the two members or rotary members 102, 202 with respect to housing 60 is the same so that the operation is the same for a power plant with a rotating outer member 12 or housing 60.

It is obvious that a great many minor variations in the details used in constructing rotary engines of this type may be made without departing from the basic principles of the invention.

While there has been described what is at present considered to be a preferred embodiment of the invention, it is apparent that many changes and modifications may be made therein without departing from the invention, and it is, therefore intended in the accompanying claims to cover all such changes and modifications as fall within the true spirit and scope of the invention.

What is claimed is:

1. A method of operating a rotary engine having a working cycle with six phases and at least three variable volume working chambers comprising the steps of supplying a charge of a first combustion medium into one of said chambers during the first phase thereof; compressing the charge in said one chamber during the second phase thereof and transferring at least a portion of the compressed charge under its own pressure from said one chamber to a second of said chambers during the second phase of said one chamber; expanding the volume of said one chamber, during the third phase of said one chamber, to reduce the pressure therein to a lower pressure, thereafter inserting a charge of a second combustion medium into said one chamber during said third phase, and thereafter transferring into said one chamber during said third phase, for mixture with the charge of said second combustion medium previously inserted therein, a compressed charge of said first combustion medium from a third of said chambers; compressing the mixture of charges of said first and second combustion mediums in said one chamber, during the fourth phase thereof, and initiating combustion of the compressed mixture during the fourth phase; expanding the combusting mixture in said one chamber to do work during the fifth phase; and, exhausting the combustion product from said one chamber, during the sixth phase.

2. A method as claimed in claim 1, in which the engine has four such chambers, and including cyclically and in sequential order, the steps of: supplying a charge of the first combustion medium to each of the fourth, third and second chambers during the first phase for each of said chambers; compressing the charge of the first combustion medium in said fourth, third and second chambers during the second phase for each of said chambers and transferring the compressed charge from the fourth, third and second chambers during the second phase thereof to the first, fourth and third chambers, respectively; supplying a charge of a second combustion medium into each of the fourth, third and second chambers during the third phase of each and transferring a compressed charge of the first combustion medium from the third, second and first chambers during the second phase of each thereof, into the fourth, third and second chambers, respectively, during the third phase thereof; compressing the mixture of charges of said first and second combustion mediums in the fourth, third and second chambers during the fourth phase of each, and initiating combustion of the compressed mixture in each during the fourth phase; expanding the combusting mixture in each of the fourth, third and second chambers during the fifth phase of each; and, exhausting the combustion product from each of the fourth, third and second chambers during the sixth phase of each.

3. A method as claimed in claim 1 in which said first and second combustion mediums are pure air, and including the step of adding fuel during the transfer operation of said third phase.

4. A method as claimed in claim 1 in which said first combustion medium is an overrich fuel-air mixture and said second combustion medium is pure air.

5. A method as claimed in claim 1 in which said first combustion medium is pure air and said second combustion medium is a fuel-air mixture.

6. A method as claimed in claim 1 in which said first and second combustion mediums are stoichiometric fuel-air mixtures.

7. The method of operating a rotary internal combustion engine having a variable volume chamber which moves in a closed path around the axis of rotation of the engine and is preceded in said path by a second such chamber and is followed in said path by a third such chamber, with a six phase operational cycle for each chamber, comprising the steps of supplying to said first chamber in the first phase thereof, a charge of a first combustion medium; compressing said charge in said first chamber during the second phase thereof and transferring the compressed charge under its own pressure to said preceding or second chamber during said second phase; supplying to said first chamber in the third phase thereof a charge of a second combustion medium and transferring, during said third phase, into said first chamber from said third or following chamber a compressed charge of said first combustion medium; compressing in said first chamber during the fourth phase thereof the mixture of charges in said chamber and initiating combustion of the compressed mixture in said fourth phase; expanding the combusting mixture in said first chamber during the fifth phase, to do work during said fifth phase; and, discharging the combustion product from said first chamber, during the sixth phase.

8. The method as claimed in claim 7 including the steps of supplying a charge of the first combustion medium to the third chamber, during the first phase of the third chamber while compressing the charge of the first combustion medium in the first chamber during the second phase thereof; expanding the volume of the second chamber during the third phase thereof to reduce the pressure therein to atmospheric pressure, applying a charge of the second combustion medium to the second chamber during the third phase thereof and after the volume has been so expanded, to thereby avoid losses in efficiency and charge, and thereafter transferring the compressed charge from the first chamber to the second chamber during the third phase of the second chamber; and applying a charge of the second combustion medium to the first chamber during the third phase thereof while compressing and igniting the mixture of charges of the first and second combustion mediums in the second chamber during the fourth phase thereof; expanding the ignited mixture during the fifth phase of the second chamber; and, discharging the combustion products during the sixth phase thereof.

9. The method as claimed in claim 8 in which the charge of the first combustion medium is transferred to the preceding chamber subsequent to the application thereto of the charge of said second combustion medium, and in which the transfer is effected when an over-critical pressure exists between the chambers.

10. A method of operating a rotary combustion engine having a working cycle with six phases and a plurality of variable volume working chambers, comprising the following steps for each of said chambers: inserting a charge of a first combustion medium into one of said chambers; compressing said charge of said first combustion medium in said one chamber and transferring from said one chamber to a preceding chamber at least a portion of the compressed charge of said first combustion medium in said one chamber; inserting a charge of a second combustion medium into said one chamber and receiving from a following chamber a charge of said first combustion medium previously compressed therein; compressing the combined charges of said first and second mediums in said one chamber and then igniting the compressed combined charges to produce a combustion product; expanding the combustion product in said one chamber; and exhausting the expanded combustion product from said one chamber.

11. A six phase internal combustion engine comprising an outer body and an inner body, one of said bodies being rotatable with respect to said other body, said outer body including axially spaced end walls and a peripheral wall interconnecting said end walls, said peripheral wall including on the inner surface thereof three symmetrically arranged circumferentially spaced lobe-defining portions, said inner body having its geometric center eccentrically displaced relative to the geometric center of said outer body and including on the outer peripheral surface thereof four symmetrically arranged circumferentially spaced apex portions, said inner surface of said peripheral wall and said outer peripheral surface being cooperatively shaped and operatively associated to define upon relative rotation of said one body with respect to said other body four variable volume working chambers, a first intake port means operatively associated with said outer body shortly beyond a point thereon spaced at a minimum distance from the center of said outer body in the direction of rotation of said one body with respect to said other body, an outlet passage means shortly before said point, a second inlet port means shortly beyond a second point thereon spaced at a minimum distance from the center of said outer body in the direction of rotation of said one body with respect to said other body, and a transfer passage means positioned effectively after both said inlet ports in said direction of rotation for placing each two adjacent working chambers of the engine into fluid communication with each other once during each operational cycle of each chamber to transfer a charge of a combustion medium from one of said each two adjacent working chambers to the other thereof which is next preceding in said direction of rotation.

12. An engine as claimed in claim 11, in which said transfer passage means is positioned at the point at which an over-critical pressure gradient exists between adjacent working chambers.

13. An engine as claimed in claim 11, in which said outer body peripheral wall has a cut-out portion forming said transfer passage means.

14. An engine as claimed in claim 11, including means operatively associated with said outer body for the addition of fuel, said means being positioned to supply fuel into said transfer passage means.

15. An engine as claimed in claim 11, in which said outerbody is a stationary member and said inner body is a rotary member.

16. A rotary internal combustion engine having a cycle which includes six phases of intake, compression-transfer, intake-transfer, compression-ignition, expansion, and exhaust and comprising an outer hollow body and an inner body supported for relative rotation, with the inner body within the outer body and turning on an axis eccentric of and parallel to the axis of the outer body, said bodies having respective facing surfaces defining at least one group of four variable volume working chambers, said facing surfaces comprising the outer surface of the inner body and the inner surface of the outer body which latter includes three arched lobe-defining portions successively joined together and extending circumferentially of the axis of the outer body, the minimum distance points of said lobe-defining portions from the axis of the outer body being at said junctions, said outer surface of said inner body including four apex portions spaced circumferentially about the axis of the inner body, said apex portions including edges parallel to the axis of the inner body continuously engaging the inner surface of the outer body, one of said bodies having individual first and second effective intake means therein each arranged to communicate with each of said working chambers only once in each cycle for feeding all said chambers successively as said bodies relatively move, said first effective intake means being operationally associated with said outer body shortly beyond a point thereon, in the direction of rotation of said one body with respect to said other body, spaced at a minimum distance from the axis of said outer body, and said second effective intake means being operationally associated with said outer body shortly beyond a second point thereon, in the direction of rotation of said one body with respect to said other body, spaced at a minimum distance from the axis of said outer body in said direction of rotation, an outlet passage arranged to communicate with each of said chambers successively, said bodies being arranged to rotate relatively in a manner determined by said apex and lobe-defining portions so that the cycle of operation is determined solely by the relative movement of the inner body with respect to said outer body, and a transfer passage in said outer body to provide communication between each two adjacent chambers once during each revolution of the inner body relative to the outer body.

17. An engine as claimed in claim 16, including means arranged to communicate with each one of said working chambers only once during the cycle of operation of each chamber, for igniting a combustion mixture in each of said chambers successively, said ignition means being operatively associated with one of said bodies and positioned in a predetermined relationship with said first and second intake port means, said transfer passage means and said outlet passage means, said outer body having first, second and third points spaced thereon successively in the relative direction of rotation of said inner body relative to said outer body and corresponding to said minimum distance points of said outer body lobe-defining portions, said outlet passage means being positioned shortly before said first point, and said first inlet portion means being positioned shortly beyond said first point, said second inlet port means and said transfer passage means being positioned between said second and third points with said transfer passage means also being positioned at a point at which an over-critical pressure gradient exists between adjacent working chambers, and said ignition means being positioned in close proximity to said third point.

18. An engine as claimed in claim 17, including means operatively associated with said outer body for the addition of fuel to said working chambers, said means being positioned for discharging fuel into said transfer passage means.

19. An engine as claimed in claim 16, in which said first intake port means is operatively associated with said outer body shortly beyond a point thereon, in the direction of relative movement of said inner body with respect to said outer body, spaced at a minimum distance from the axis of said outer body; said outlet passage means is positioned shortly before said point in said direction of rotation and operatively associated with said outer body; said second intake port means is operatively associated with said outer body shortly beyond a second point thereon in said direction of rotation, spaced at a minimum distance from the axis of said outer body; and, said transfer passage means is positioned effectively after both of said inlet port means in said direction of rotation and before a third point on said outer body in said direction of rotation, spaced at a minimum distance from the center thereof.

References Cited in the file of this patent

UNITED STATES PATENTS

| 859,746 | Crowe | July 9, 1907 |
| 1,443,885 | Owen | Jan. 30, 1923 |
| 1,489,005 | Powell | Apr. 1, 1924 |
| 1,512,710 | Potter | Oct. 21, 1924 |
| 1,562,692 | De Rochefort-Lucay | Nov. 24, 1925 |
| 1,606,479 | Midgley | Nov. 9, 1926 |
| 1,638,287 | Burtnett | Aug. 9, 1927 |
| 1,907,470 | Abell | May 9, 1933 |
| 2,018,848 | Gruebler | Oct. 29, 1935 |
| 2,196,071 | Hudson | Apr. 2, 1940 |

FOREIGN PATENTS

| 673,265 | France | Oct. 7, 1929 |
| 406,173 | Great Britain | Feb. 22, 1934 |
| 557,902 | Great Britain | Dec. 9, 1943 |